United States Patent [19]

Butler et al.

[11] Patent Number: 4,870,878
[45] Date of Patent: Oct. 3, 1989

[54] APPARATUS AND METHOD FOR REMOVING A SLUG OF INSULATION ALONG A LENGTH OF INSULATED WIRE

[75] Inventors: John D. Butler, Germantown; Keith A. Johnson, Pewaukee, both of Wis.

[73] Assignee: Mechtrix Corporation, Menomonee Falls, Wis.

[21] Appl. No.: 197,088

[22] Filed: May 20, 1988

[51] Int. Cl.⁴ .............................................. H02G 1/12
[52] U.S. Cl. .................................................. 81/9.51
[58] Field of Search ................................. 81/9.51, 9.4

[56] References Cited

U.S. PATENT DOCUMENTS

| | | | |
|---|---|---|---|
| 3,364,801 | 1/1968 | Johnston | 81/9.51 |
| 3,657,795 | 4/1972 | Mackay | 81/9.51 |
| 3,748,932 | 7/1973 | Neiman et al. | 81/9.51 |

Primary Examiner—Roscoe V. Parker
Attorney, Agent, or Firm—Fuller, Puerner & Hohenfeldt

[57] ABSTRACT

Apparatus for center notching an insulated electrical conductor includes two pairs of cutting blades that circumferentially slice the insulation at predetermined locations along the insulated electrical conductor to thereby define a slug of insulation. A jaw with a knife edge is located in each of the four quadrants about the insulated electrical conductor axis. The jaws travel in respective rectangular paths in a four stroke cycle. During the first stroke the jaws are translated toward a first plane passing longitudinally through the insulated electrical conductor axis with the knife edges in a separated configuration. During the second stroke the jaws translate toward a second plane perpendicular to the first plane to close the jaws and cause the knife edges to longitudinally penetrate the insulation slug. During the third stroke the jaws are translated away from the first plane with the knife edges in the closed configuration to thereby strip the insulation slug from the conductor. During the fourth stroke the jaws translate away from the second plane to return the knife edges to the open configuration.

39 Claims, 5 Drawing Sheets

APPARATUS AND METHOD FOR REMOVING A SLUG OF INSULATION ALONG A LENGTH OF INSULATED WIRE

BACKGROUND OF THE INVENTION

1. Field of the Invention

This invention pertains to processing insulated electrical conductors, and more particularly to apparatus and methods for removing selected portions of insulation from electrical conductors.

2. Description of the Prior Art

Various equipment has been developed to strip insulation from insulated electrical conductors and to cut long lengths of conductor into individual pieces. Examples of such equipment may be seen in U.S. Pat. Nos. 4,577,405; 4,630,406; and 4,702,136. The tooling and machinery illustrated in the foregoing patents are useful primarily for stripping selected lengths of insulation from the ends of discrete pieces of insulated wire.

Another very important aspect of processing insulated wire is the removal of short lengths of insulation at one or more locations intermediate the wire ends. The removal of discrete portions or slugs of insulation from the interior of a length of wire is referred to as center notching. Such terminology is somewhat misleading since a notch formed by removing a slug of insulation need not be at or even near the center of a piece of insulated wire. In fact, several slugs may be removed from a single piece of wire. However, to maintain consistency with industrial usage, the term center notching as used herein is defined as the removal of one or more pieces or slugs of insulation from anywhere between the ends of a length of insulated electrical conductor.

Figure 12A:
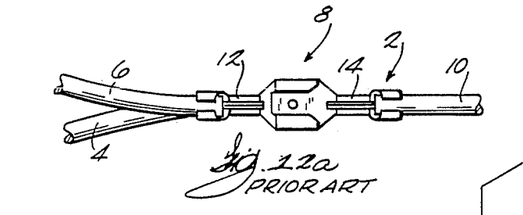
FIG. 12a is a view of a typical prior art wire harness.
Figure 12B:
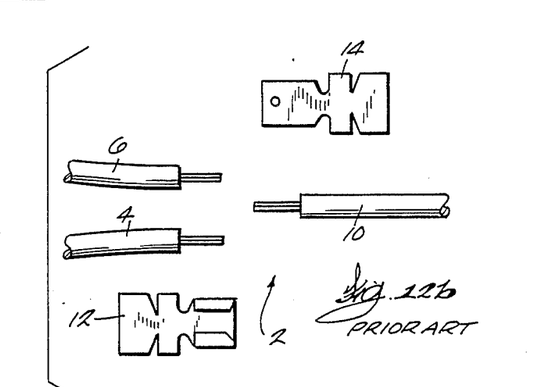

Center notching is highly desirable in electrical circuits that require the stripped ends of separate lengths of insulated wires to be spliced or doubled together to form an electric wire harness. As an example, without center notching, a three-legged harness requires five components, three wires and two terminals, to connect the ends of the three wires together. A simple three-wire harness 2 is pictured in FIG. 12a. Wires 4 and 6 are doubled on one side of the joint 8. Both of the wires 4 and 6 are spliced to wire 10 by means of a female terminal 12 and a male terminal 14. An exploded view of the components of the harness 2 is shown in FIG. 12b.

Figure 13A:
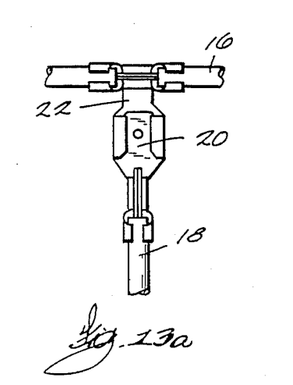
FIG. 13a is a view of a typical wire harness that includes a center notched wire.

With center notching, one wire length is eliminated, since two legs of the harness are replaced by one center notched length. The third leg is attached to the center notch, as is shown in FIG. 13a. Therefore, in this example, only four components, one center notched wire 16, one other wire 18, and two terminals 20 and 22, are required Numerous designs of terminals are available for that type of connection.

A further simplification can be realized if the third leg of the harness is welded to the wire center notch, thereby eliminating the terminals.

Figure 13B:
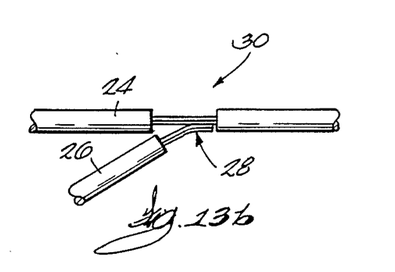
FIG. 13b is a view of a simplified wire harness that includes a center notched wire.

Referring to FIG. 13b, a harness 30 is shown that has only two components. They are a center notched wire 24 and another wire 26 that are joined together by a weld 28. The harness 30 represents a substantial reduction in the number of components compared with the harness 2 of FIGS. 12a and 12b. The ability to reduce the number of harness components offers cost savings not only in piece parts and material handling, but also in increased reliability due to fewer parts that could potentially fail.

Figures 1A, 1B, 1C:
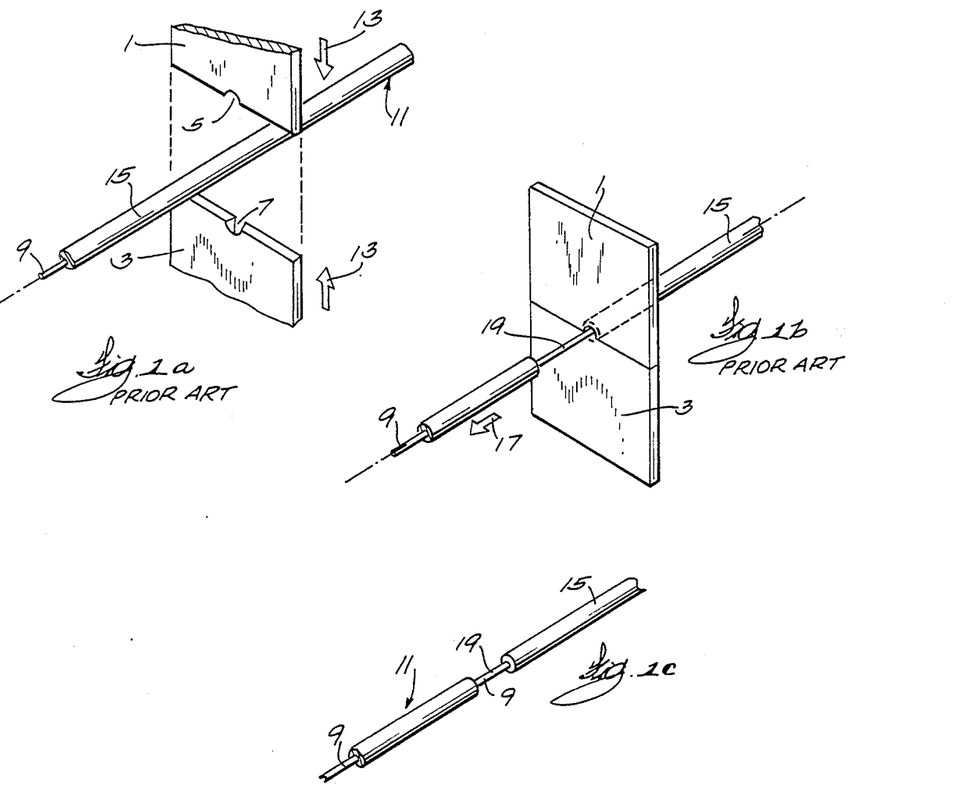
FIGS. 1a, 1b and 1c are schematic perspective views of a prior method and apparatus for center notching insulated electrical conductors.

To date, center notching of insulated electrical conductors has not been performed in a satisfactory manner. Prior apparatus and methods lack the ability to remove slugs of insulation on an automated basis. One method of center notching, and the tooling used therefore, is illustrated in FIG. 1. A pair of blades 1 and 3 have respective radius cutting edges 5 and 7 that conform to the circular periphery of the conductor 9 of an insulated electrical conductor 11. The blades 1 and 3 are closed in the direction of arrows 13 over the insulated electrical conductor 11 to slice the insulation 15 around the periphery of the conductor 9. With the blades in the closed position of FIG. 1b, the wire 11 is pulled axially in the direction of arrow 17, with the blades remaining fixed. As a result, a short length 19 of conductor 9 is exposed. The short length 19 of bare conductor represents the intended center notch. It will be apparent that the center notch is produced by sliding or compressing the insulation along the conductor rather than by stripping a slug of unwanted insulation from the wire.

Other variations of prior center notching techniques include the use of two pairs of blades, such as blades 1 and 3. The blades are placed with their respective pairs of cooperating cutting edges next to each other. When closed over an insulated wire 11 the two pairs of cutting blades essentially make a single circumferential slice in the insulation. The two pairs of blades are then translated in opposite directions to each other along the axis of the insulated electrical conductor. Each pair of blades axially compresses the insulation in the direction of the blade axial motion. As a result, bare conductor 9 is exposed between the two sets of blades. Whether one or two pairs of blades are used, the procedure of compressing insulation rather than removing a discrete slug of it is a major disadvantage of prior center notching methods Since no insulation is actually removed from an insulated electrical conductor by prior methods and equipment, the length of a notch 19 can vary significantly from the desired length. Variables that affect actual notch length include the elasticity and compressibility of the insulation, the bonding between the insulation and the conductor, the twist of lay of the conductor strands, the spacing between notches, and ambient conditions. The longer the notch length, the more the insulation must be compressed. Many insulation materials such as plastics and rubber have memories. Consequently, after they have been compressed, they tend to relax back to their former condition when the compressive force is removed. Prior center notching is based on the assumption that the compressed insulation does not relax significantly. Such an assumption is not always justified in practice, with the result that prior center notched wires are unreliable.

Accurately controlling the length of the center notch is very important in applications in which a terminal is to be assembled to the exposed conductor. Typical terminals have conductor ears or tabs that are crimped onto the conductor 9. It is imperative that no insulation get between the terminal and conductor. With prior center notching, there is an undesirably high probability that the compressed insulation will relax prior to terminal attachment, thereby causing an improper assembly and impairing conductivity. Further, many terminals have insulation ears that are designed to crimp around adjacent parent insulation for added pull test strength. Thus, variations in notch lengths create problems in locating and attaching terminals, and the quality of the resulting harness is suspect.

Thus, a need exists for improved methods and equipment for center notching insulated electrical conductors.

SUMMARY OF THE INVENTION

In accordance with the present invention, an efficient method of stripping discrete slugs of insulation from insulated electrical conductors is provided, together with reliable mechanisms for carrying out the stripping method. This is accomplished by apparatus that includes two sets of cutting instruments that are operated in time relationship so as to slice and strip the insulation slug from the conductor.

The first set of cutting instruments comprises two pairs of blades. Each pair reciprocates in a plane perpendicular to the axis of the insulated electrical conductor. The blades of each pair have cooperating radius cutting edges sized and located to radially slice through to the conductor. The pairs of the first set of cutting blades are spaced apart along the insulated wire such that their cutting edges define the length of the slug of insulation to be removed.

The second set of cutting instruments comprises two pairs of jaws having respective sharp knife edges. A jaw is located in each of the four quadrants around the longitudinal axis of the insulated wire, with the knife edges proximate to the wire. Each jaw travels in a respective rectangular path within its quadrant in synchronization with the other jaws and with the first set of cutting instruments. The four jaws move along their respective rectangles at the same time in a four-stroke cycle. During the first stroke, the jaws translate toward a first plane passing longitudinally through the insulated electrical conductor axis. During the first stroke, the jaw knife edges are in an open configuration wherein the knife edges of each pair of jaws are separated by a distance greater than the diameter of the wire insulation, and the knife edges pass outside the insulated electrical conductor. The first stroke terminates when the four knife edges become substantially coincident with the first plane.

During the second stroke of jaw motion, the jaws translate to approach a second plane that is perpendicular to the first plane and that passes longitudinally through the insulated wire axis. That is, during the second stroke the jaws translate parallel to the first plane. The second stroke terminates when the respective knife edges have sliced through the insulation of the insulated electrical conductor and are in close proximity to the conductor. As a result, the insulation is cut into two hollow cylindrical halves.

During the third stroke, the jaws translate away from the first plane along a line parallel to the line of the first stroke but at a distance from the line of the first stroke equal to the travel of the second stroke. As the jaws move away from the insulated electrical conductor, the knife edges embedded in the insulation pull the hollow cylindrical insulation halves from the conductor. The travel of the jaws during the third stroke equals the travel of the first stroke, but in the opposite direction.

During the fourth stroke, the jaws travel away from the second plane along a line parallel to the line of the second stroke but at a distance therefrom equal to the distance traveled during the first and third strokes. The travel of the jaws during the fourth stroke is equal to the travel during the second stroke, but in the opposite direction. Thus, the cycle is completed, and each jaw travels in a respective rectangular path.

To positively locate the insulated electrical conductor during the second stroke, that is, while the jaw knife edges are penetrating the insulation, the present invention includes a pair of oppositely reciprocable fingers. The fingers are generally coplanar with the second plane, and they are located on opposite sides of the first plane. The fingers travel in unison with the jaws during the first and third strokes. During the first stroke, the fingers approach and snugly grip the insulated wire. The fingers remain stationary during the second stroke, and then move oppositely apart during the third stroke. The fingers are stationary during the fourth stroke.

The translation of the jaws and fingers is produced by a novel mechanism for producing pure rectangular motion. In the preferred embodiment, the mechanism comprises a pair of tool holders that are oppositely reciprocated on opposite sides of the insulated electrical conductor. Mounted to each tool holder is a plate-like support that retains and guides one pair of the jaws. The jaws have their respective knife edges at one end, and a longitudinally extending slot is formed in the other end, which faces away from the insulated electrical conductor. The jaw slots are generally parallel to the second plane. The plate contains first and second slots that are parallel to the first and second planes, respectively. The two jaws are slidingly retained in the first slots by respective appropriate first fasteners. Scissors-like links pivotally connect the first fastener of each jaw to a similar second fastener that slidingly passes through the slots in the back end of the other jaw. A pivotal connector joins the midpoints of the links and is slidingly retained in the plate second slot. Operating the scissors links causes the two jaws in the plate to translate parallelly along a line parallel to the first plane for equal distances but in opposite directions. Operation of the scissors links may be by a fluid cylinder connected to the second fasteners in the jaw slots through a common input linkage.

Further in accordance with the present invention, the second set of cutting instruments includes means for adjusting the open and closed configurations of the knife edges. The adjustment means preferably is in the form of a threaded rod that engages one of the jaws and extends through the plates parallel to the first plane. Because of the scissors linkage, adjusting movement of the rod to move one jaw relative to the plate causes the other jaw to move by the same amount but in the opposite direction. The adjustment feature renders the apparatus of the present invention suitable for center notching a wide range of insulated electrical conductors.

In operation, the center notching apparatus of the present invention is normally inserted in insulated electrical conductor processing machinery between a supply of the wire and a stripping and cutoff machine. Wire from the supply roll is fed through the center notching machine, which removes insulation slugs of predetermined length and at predetermined intervals along the wire. To remove the slugs, the respective pairs of the cutting blades of the first set of cutting instruments are reciprocated toward each other to circumferentially slice the insulation. The closed pairs of blades are then translated a short distance in opposite directions along the wire. That motion assures that the slug insulation is fully separated from the parent insulation on both ends of the slug. The cutting blades are then withdrawn from the wire, and the four-stroke cycle of the second set of cutting instruments occurs. During the first stroke, the fingers approach the wire from opposite sides to grip it as the jaw knife edges longitudinally penetrate the slug insulation during the second stroke The knife edge penetration splits the insulation slug longitudinally, creating two symmetrical, hollow cylindrical halves. The third stroke strips the halves from the conductor, thereby creating the notch in the insulated wire. The fingers withdraw from the conductor along with the jaws during the third stroke, and the fingers help hold and guide the insulation halves as they are being stripped from the conductor and withdrawn therefrom. The slug halves are knocked from the jaw knife edges, and the jaws undergo the fourth stroke to complete the cycle. The notched wire is then fed to the next station of the insulated wire processing machinery, wherein discrete pieces are cut from the supply and either or both piece ends are stripped of insulation.

Other advantages and features of the invention will become apparent to those skilled in the art upon reading the detailed disclosure.

BRIEF DESCRIPTION OF THE DRAWINGS

FIGS. 9a and 9b are side views of the mechanism for producing parallel motion of the stripping jaws of the present invention.

FIG. 12b is an exploded view of the wire harness of FIG. 12a.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figures 2, 8:
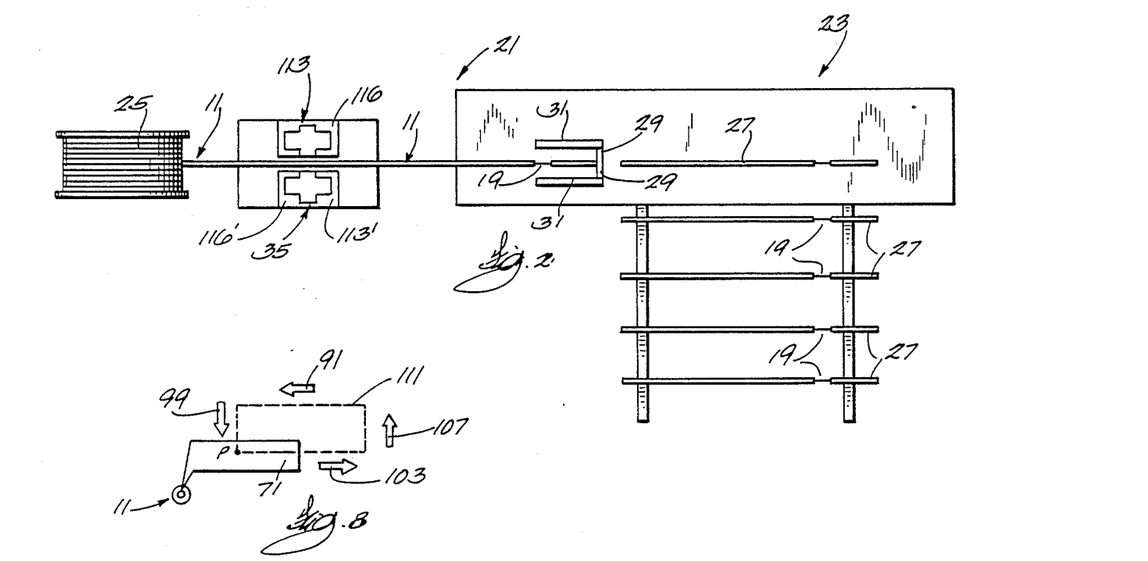
FIG. 2 is a simplified top view of apparatus for processing insulated electrical conductors that includes the center notching apparatus of the present invention.
FIG. 8 is a schematic view of the rectangular motion of a jaw according to the present invention.

Referring to FIG. 2, apparatus 21 for processing insulated electrical conductors is schematically illustrated that includes the present invention. The apparatus 21 includes a wire stripping and cutting machine 23. Insulated electrical conductor 11 is supplied to the machine 23 from a supply roll 25. In the machine 23, the insulated electrical conductor is cut into individual pieces 27 by the action of cutting blades 29 that are mounted in oppositely reciprocating tool holders 31, as is known in the art. Examples of machinery designed to process individual pieces of insulated electrical conductor may be seen in U.S. Pat. Nos. 3,309,948; 3,527,124; 3,857,306; 3,913,426; and 4,317,391. Additional blades may also be mounted in the tool holders 31 for stripping the insulation from the ends of the pieces 27. However, for clarity, the stripping blades are not shown in FIG. 2. A conveyor system schematically illustrated at reference numeral 33 may be employed to transport the individual cut and stripped pieces from the machine 23 to other stations for further processing.

In accordance with the present invention, a center notching apparatus 35 is installed between the wire supply roll 25 and the cutting and stripping machine 23. The center notching apparatus 35 is used to strip slugs of insulation from the insulated wire 11 at predetermined locations therealong, thereby leaving notches, typically shown at reference numeral 19, of exposed conductor 9.

Figure 3:
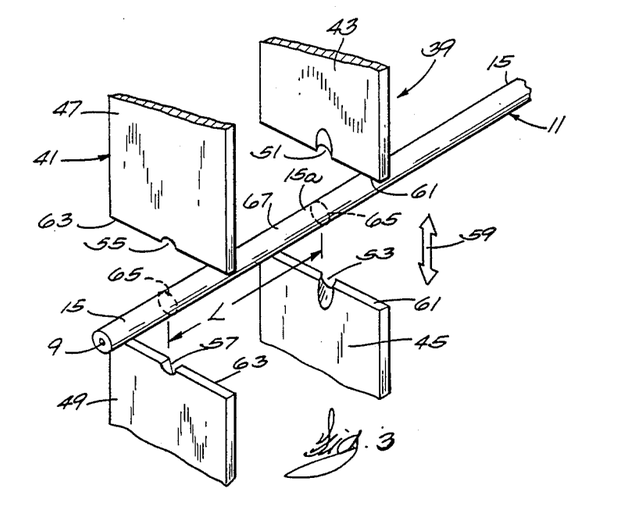
FIG. 3 is a perspective view of a pair of cutting blades that form a portion of the apparatus of the present invention.
Figure 4:
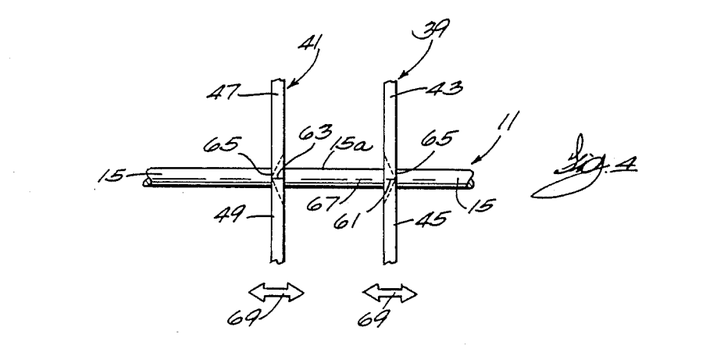
FIG. 4 is a side view of the cutting blades of FIG. 3, but showing them in a closed position over the insulated electrical conductor.
Figure 4A:
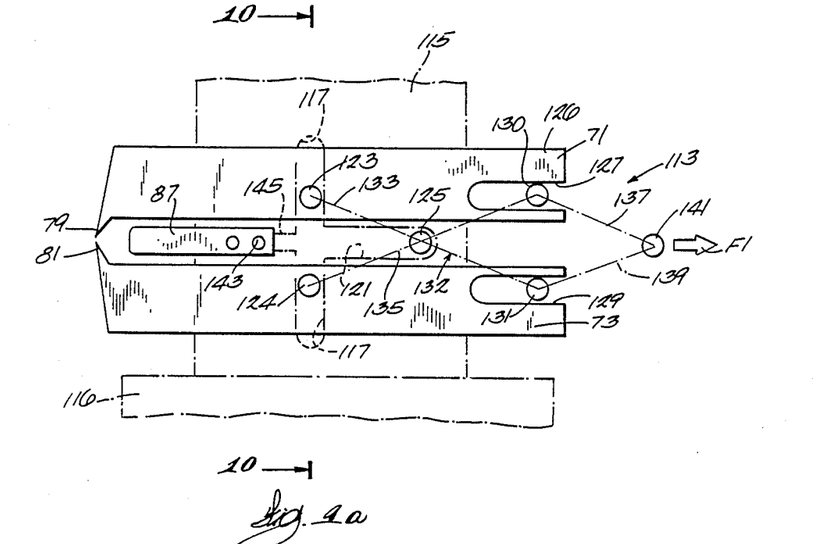
Figure 4B:
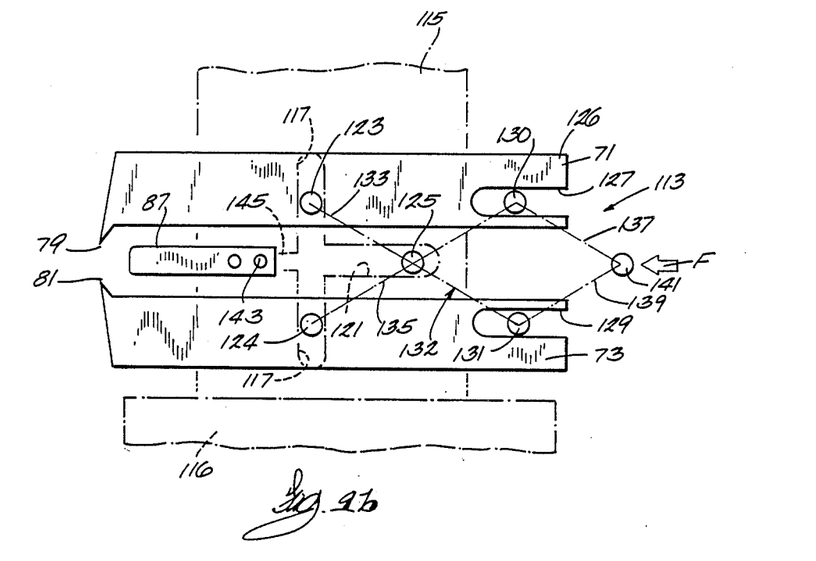

Turning to FIGS. 3, 4, and 6, the center notching apparatus 35 includes two sets of cutting instruments. The first set of cutting instruments comprises two pairs of cutting blades 39 and 41. The pairs of cutting blades 39 and 41 include respective butting blades 43, 45 and 47, 49. The blades 43 and 45 have respective radiused cutting edges 51 and 53. The butting blades 47 and 49 have respective cutting edges 55 and 57. The butting blades 43, 47 and 45, 49 are mounted in suitable respective holders, not shown, that reciprocate the blades transversely to the axis of the insulated electrical conductor, such as the in the directions of arrow 59. It will be appreciated, of course, that blade reciprocation may be in any directions that are perpendicular to the axis of the insulated electrical conductor. The cutting edges 51, 53 and 55, 57 cooperate to circumferentially slice the insulation 15 of the insulated wire 11 as the blades close over the wire. The cutting edges of the blades are dimensioned such that they do not nick the conductor 9 when the cutting blade leading edges 61 and 63 come into abutting contact. As a result, the insulation is circumferentially sliced at two locations 65 along the insulated wire. The distance L between the slices 65 defines the length of a slug 67 of insulation that is to be removed from the wire.

To assure that the insulation 15a of the slug 67 is completely separated from the parent insulation 15 on the insulated electrical conductor on both sides of the slug, the tool holders holding the cutting blades 39 and 41 are designed to reciprocate in the directions of arrows 69. The cutting blades 39 and 41 reciprocate in opposite directions with the insulated wire held stationary and with the butting blades 43, 45 and 47, 49 in the closed position. Consequently, any connecting insulation between the slug insulation 15a and the parent insulation after the slicing operation by the blades 39, 41 will be torn away. Accordingly, the slug insulation 15a is completely separated from the parent insulation by slices 65, which are shown in exaggerated length in FIG. 5.

Figure 5:
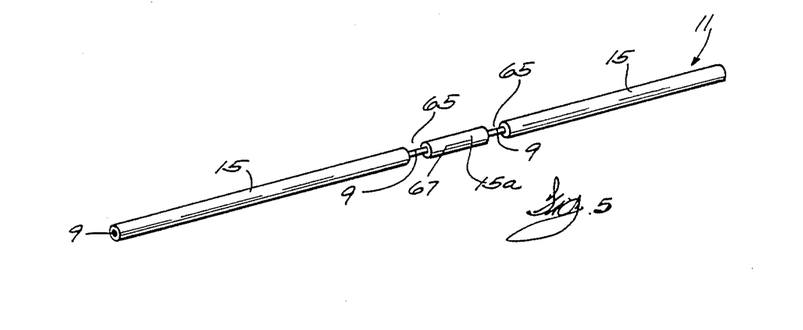
FIG. 5 is a perspective view of an insulated electrical conductor having a slug length formed by the cutting blades of the present invention.
Figure 6A:
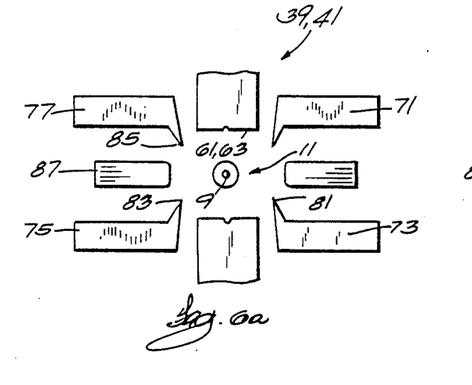
FIGS. 6a-f are simplified end views of the apparatus of the present invention showing the sequence of operation for center notching an insulated electrical conductor.
Figure 6B:
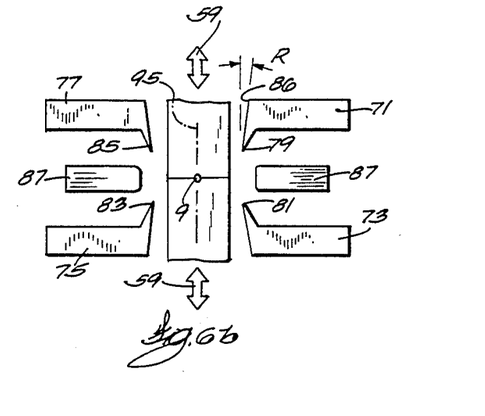
Figure 7:
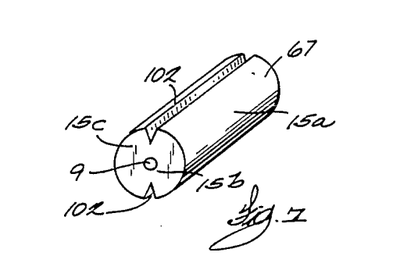
FIG. 7 is a perspective view of a slug of insulation as it exists at a certain time during the center notching process.

The reciprocating motion of the cutting blades 39 and 41 perpendicular to the insulated wire axis is also shown in FIGS. 6a and 6b. FIG. 6a corresponds to FIG. 3, and FIG. 6b corresponds to FIG. 4. After the butting blades 43, 45, 47, and 49 have sliced and torn the insulation 15 to define the slug 67 as shown in FIG. 5, they remain butted together until the insulation slug halves 15a and 15b shown in FIG. 7 are completely removed.

Looking at FIGS. 6c-6f, the apparatus and process of stripping the slug of insulation 15a from the insulated electrical conductor 11 will be explained. The present invention includes four jaws 71, 73, 75, and 77. One jaw is situated in each of the quadrants about the longitudinal axis of the insulated electrical conductor. Each jaw has a respective knife edge 79, 81, 83, and 85 that is proximate to the insulated wire. Knife edges 79 and 81 are in facing relationship to each other, and knife edges 83 and 85 are in facing relationship to each other. The knife edges have cutting lengths equal or approximately equal to the length L of the slug 67. The jaws and knife edges are located in the machine such that the knife edges are transversely aligned with the slug. The jaws and the knife edges may be located between the cutting blades 39 and 41. The present invention further includes a pair of opposite fingers 87. While the cutting blades 39 and 41 are performing the circumferential slicing operation on the insulated electrical conductor, the jaws 71, 73, 75, and 77 and the fingers 87 are withdrawn from the vicinity of the wire, as shown in FIGS. 6a and 6b. After the butting blades 43, 45, 47, and 49 have sliced and torn the insulation 15 to define the slug 67 as shown in FIG. 5, they remain butted, and then the jaws and fingers come into play. For clarity, the cutting blades are not shown in FIGS. 6c-6f.

Figure 6C:
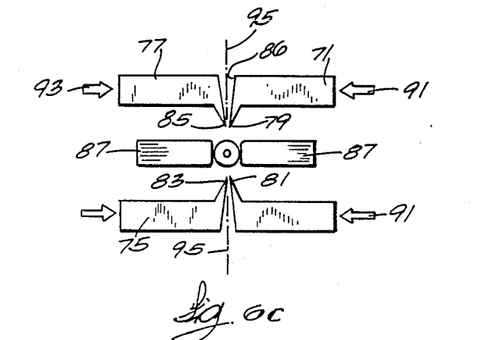

The insulation stripping cycle starts with a first stroke, FIG. 6c. During the first stroke, jaws 71 and 73 translate linearly and parallelly in the direction of arrows 91. Jaws 75 and 77 translate linearly and parallelly in the direction of arrows 93, such that the knife edges 79, 81, 83, and 85 approach a first plane 95 passing longitudinally through the axis of the insulated electrical conductor. The jaws 71 and 77 approach each other until their respective knife edges 79 and 85 nearly contact. A slight space of only a few thousandths of an inch will be allowed to prevent the possibility of one edge from damaging the other if they were to actually contact each other. For clarity, an exaggerated space is shown between the knife edges in FIG. 6c. Similarly, knife edges 81 and 83 of jaws 73 and 75 nearly contact. Simultaneously, the fingers 87 approach each other and snugly grip the insulated electrical conductor 11 on the opposite sides thereof. During the first stroke, the distance between the knife edges 79, 81 and 83, 85 is greater than the diameter of the insulation of the wire.

Figure 6D:
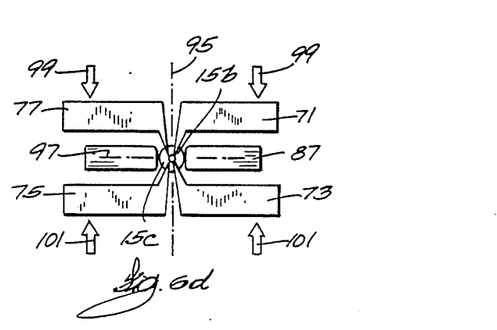

The second stroke of the stripping cycle is shown in FIG. 6d. During the second stroke, jaws 71 and 73 move linearly and parallelly toward each other in the directions of arrows 99 and 101, respectively. Jaws 75 and 77 move linearly and parallelly toward each other. Consequently, the jaws approach a second plane 97 passing longitudinally through the insulated wire axis and perpendicular to the plane 95. As the jaws approach plane 97, their respective knife edges penetrate the insulation 15a of the slug 67 to create diametrically opposed longitudinal slices 102, FIG. 7. Motion of the jaws during the second stroke ceases just as the knife edges come in close proximity to the conductor 9, thereby creating two hollow cylindrical insulation halves 15b and 15c.

Figure 6E:
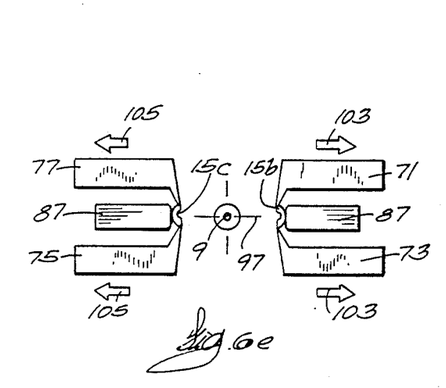

Now looking at FIG. 6e, the third stroke of the stripping cycle occurs when the jaws 71 and 73 move away from the plane 95 in the direction of arrows 103, and jaws 75 and 77 move in the direction of arrows 105. The opposed motion of the jaws is accompanied by opposite reciprocation of the fingers 87. Because the knife edges have penetrated the slug insulation during the second stroke, the withdrawal of the jaws from the plane 95 strips the insulation halves 15b and 15c transversely from the conductor 9. The fingers help to retain the insulation halves in place so that they may later be reliably removed.

Figure 6F:
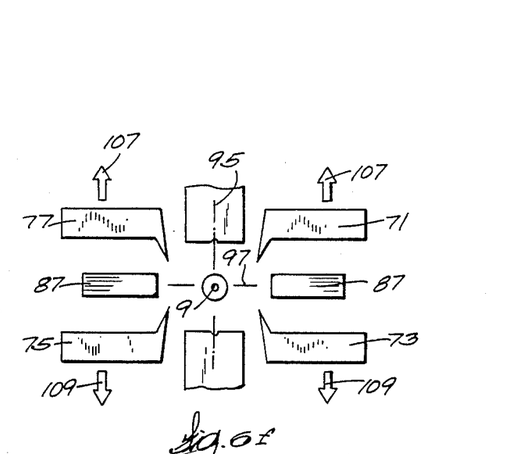

Turning next to FIG. 6f, the jaws 71 and 73 move linearly away from each other in the direction of arrows 107 and 109, respectively, during the fourth stroke. Jaws 75 and 77 move away from each other in the direction of arrows 109 and 107, respectively. At the same time, a positive knock out, not illustrated in FIG. 6f, sweeps across the knife edges 79, 81, 83, and 85 to remove the insulation halves 15b and 15c. The jaws and fingers have then completed the stripping cycle. The insulated electrical conductor is ready to be indexed axially for the beginning of the next center notching cycle, FIG. 6a.

It will be noticed that every point on each of the jaws 71, 73, 75, and 77 travels only along lines forming a rectangle during the four stroke stripping cycle. For example, arbitrary point P on jaw 71 travels along the lines of rectangle 111, shown in FIG. 8, as it moves in the directions of arrows 91, 99, 103, and 107. Similar points on jaw 71 and on the other jaws also travel only along their respective rectangles of the same size and shape as rectangle 111. Such rectangular motion is very important for proper penetration of the slug insulation 15a by the jaw knife edges 79, 81, 83, and 85 during the second stroke of the stripping cycle Pure rectangular motion is also important for the proper stripping of the two hollow cylindrical insulation halves 15b and 15c during the third stroke.

Figure 10:
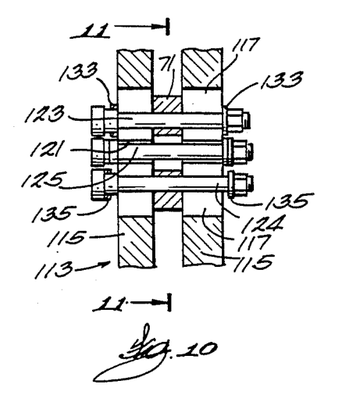
FIG. 10 is a cross sectional view taken along lines 10—10 of FIG. 9b.
Figure 11:
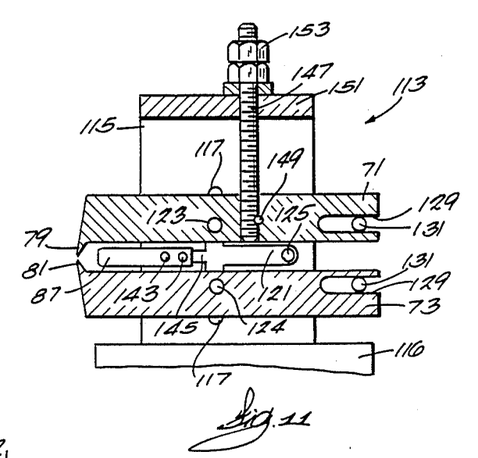
FIG. 11 is a cross sectional view taken along lines 11—11 of FIG. 10.

It is a feature of the present invention to provide a mechanism for producing pure rectangular motion of the jaws 71, 73, 75, and 77. Referring to FIGS. 9-11, a mechanism 113 is illustrated that produces parallel motion of the jaws for two of the lines of a rectangle, such as rectangle 111. The mechanism 113 includes a pair of spaced parallel plates 115. The plates 115 are mounted in a reciprocable tool holder 116. Cut through each plate is a first slot 117 and a second slot 121. In FIG. 9, the slots 117 and 121 are shown as intersecting, but such intersection is not required. The plates are mounted such that the slot 117 is parallel to the first plane 95, and slot 121 is parallel to the second plane 97. Shoulder screws or similar pivotable connectors 123, 124 are inserted through the aligned slots 117. The shoulder screws 123, 124 pass through holes in two jaws, typically represented by reference numerals 71 and 73, that are retained between the plates. Another shoulder screw 125 is inserted through the plates' aligned second slots 121. In the back ends 126 of the jaws 71 and 73 are machined respective slots 127 and 129. The slots 127, 129 are parallel to the second plane 97. Shoulder screws 130, 131 pass through the slots 127 and 129. A scissors linkage 132 is comprised of a first link schematically represented in FIG. 9 by reference numeral 133. There may be a link 133 on the outside of each plate. The links 133 are pivotally joined to the shoulder screw 123 in jaw 71, to the shoulder screw 125, and to the shoulder screw 131 in the slot 129 of jaw 73. A second pair of links 135 is pivotally joined to the shoulder screw 124 in jaw 73, to the shoulder screw 125, and to the shoulder screw 130 in the slot 127 of jaw 71. A set of input links 137 and 139 are pivotally joined to each other at one of their respective ends to form a common point 141. The second end of the link 137 is pivotally joined to shoulder screw 130 in the slot 127 of jaw 71. The second end of the link 139 is pivotally joined to the shoulder screw 131 in slot 129.

Mounted between the plates 115, as by screws 143, is a finger 87. The finger is adjustable on the plates by virtue of a slot 145, through which the screws 143 pass. In FIG. 9, the slots 145 are shown as connecting with slots 117 and 121, but such connection is not necessary. The finger preferably is coplanar with plane 97.

In FIGS. 9a and 9b, arrows F and F1 represent input forces to the scissors linkage 132 of the mechanism 113 for producing parallel motion of the jaws 71 and 73. In FIG. 9a, the jaws are shown in a closed configuration wherein their knife edges 79 and 81 are in close proximity to each other. When force F is applied to the common point 141, the force F is transmitted through the links 137 and 139 to the shoulder screws 130, 131, and then from the shoulder screws 130, 131 to the shoulder screws 125, 123, and 124 by means of the links 133 and 135. The shoulder screws 123, 124 are restrained from horizontal movement by the vertical slots 117 in the plates 115. However, shoulder screw 125 is capable of horizontal movement within slot 121. Shoulder screws 130, 131 are capable of horizontal movement in slots 127 and 129. Consequently, under force F the shoulder screws 125, 130, and 131 move to the left, and in doing so the shoulder screws 123, 124 move vertically apart within the slots 117. Because of the links 133 and 135, the shoulder screws 130 and 131 move vertically apart the same amount as the shoulder screws 123 and 124. As a result, the jaws 71 and 73 move apart from each other in a parallel manner so as to attain the open configuration of FIG. 9b, wherein the knife edges 79 and 81 have separated.

The jaws 71 and 73 translate in a parallel manner from the open configuration of FIG. 9b to the closed configuration of FIG. 9a by applying force F1 to the common point 141. The links 133, 135 and 137, 139 cooperate with the horizontally restrained shoulder screws 123 and 124 to horizontally displace the shoulder screw 125. Simultaneously, the shoulder screws 123 and 130 travel vertically toward shoulder screws 124 and 131, respectively, to cause the jaws to travel in a parallel fashion toward each other.

A second mechanism 113', shown in FIG. 2 but not in FIG. 9, is also employed in the center notching apparatus 35. Mechanism 113' is identical to mechanism 113 previously described. Mechanism 113' is mounted in tool holder 116', FIG. 2. Looking also at FIG. 6, the second mechanism 113' contains jaws 75 and 77, and it operates in an identical manner and in timed relation to the mechanism 113.

At the start of the center notching process, force F of FIG. 9 is applied, thereby operating the scissors linkage 132 to translate the jaws to the open configuration of FIGS. 6b and 9b. The tool holders 116 and 116' and the mechanisms 113 and 113' are respectively positioned such that the jaw knife edges 71, 81, 83, and 85 are withdrawn from the planes 95 and 97 to a back position, significantly displaced from the planes 95 and 97, in order to aid efficient scrap insulation removal. This back position is in an area that provides less interference by the mechanism for reciprocating cutting blades 39 and 41, when the useless insulation halves 15a and 15b of FIG. 7 are removed.

During the first stroke of the slug stripping cycle, the jaws 71, 73, 75, and 77 remain in the open configuration of FIGS. 6a, 6b, and 9b. The advancement of the jaws toward the plane 95 during the first stroke is caused by the linear movement of the tool holders 116 and 116', to which the plates 115 are mounted. Tool holder advancement may be accomplished by any conventional drive components in the machine 35 as are known in the art. The fingers 87, being mounted to the plates 115, advance toward the insulated electrical conductor 11 along with the plates. The fingers are adjustably located in the plate slots 145 such that the fingers snugly grip the insulated wire at the end of the first stroke.

At the completion of the first stroke, the tool holders 116 and 116' and plates 115 become stationary. Then the force F1 is applied to the common point 141 of each mechanism 113 and 113', as by a fluid cylinder, not illustrated in FIGS. 9a and 9b. The force F1 causes parallel translation of the jaws 71 and 73 (and jaws 75 and 77) to approach each other and attain the closed configuration of FIGS. 6d and 9a, thereby performing the second stroke of the stripping cycle. At the end of the second stroke, the knife edges 79 and 81 have closed to produce the longitudinal slices 102 in the insulation slug 67, FIG. 7.

The third stroke is accomplished by retaining the jaws in the closed configuration of FIGS. 6d and 9a and by moving the tool holders 116 and 116' away from the plane 95. The tool holders return to the respective positions they occupied at the beginning of the first stroke. The fingers 87 retract with the plates 115 in the tool holders. Because the knife edges are embedded within the slug insulation 15a at the beginning of the third stroke, the knife edges strip the insulation halves 15b and 15c from the conductor 9 as the tool holders are moved away from the plane 95.

At the end of the third stroke, the tool holders 116 and 116' remain stationary. Force F is applied to the mechanism 113 (and mechanism 113') of FIG. 9a. As a consequence, the links 133 and 135 cooperate With the shoulder screws 123, 124, 125, 130, and 131 to open the jaws to the configuration of FIG. 9b, thereby performing the fourth stroke of the insulation stripping cycle. The jaws are then ready to repeat the cycle for the next center notching operation.

In FIG. 9a, the jaw knife edges 79 and 81 are shown as almost touching when the jaws 71 and 73 are in the closed configuration. In operation, a spacing must exist between the closed knife edges that is slightly greater than the diameter of the conductor 9 of the insulated wire being processed. In addition, adjustability of the spacing between the closed knife edges must be possible so as to permit processing different sized wires. Components for making such adjustments are shown in FIG. 11. A long threaded rod 147 is inserted in the jaw 71, where it may be staked in place with a pin 149. The rod 147 passes through a hole in a spacer 151 that is sandwiched between the plates 115 at the top ends thereof. The width of the spacer 151 is slightly greater than the width of the jaws. A washer 152 and nuts 153 are threaded onto the projecting end of the rod. By turning the nuts 153, the threaded rod is raised or lowered relative to the plates 115, thereby causing identical motion in the jaw 71. Because of the shoulder screw 123 in the jaw 71 and the remainder of the mechanism 113, particularly the scissors linkage 132, the jaw 73 will be moved the same amount as the adjustment to jaw 71, and in the opposite direction. In that manner, the spacings between the facing knife edges can be set to control the penetration of the slug insulation during the second stroke. Consequently, the stripping mechanism of the present invention is able to accommodate a wide variety of insulated wire sizes.

Thus, it is apparent that there has been provided, in accordance with the invention, apparatus and method for removing a slug of insulation from a length of insulated wire that fully satisfies the aims, objects, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for center notching an insulated electrical conductor comprising:
   a. first cutting means for circumferentially slicing the insulation of the insulated electrical conductor at predetermined locations therealong to thereby define the length of a slug of insulation; and
   b. second cutting means for translating in a four-stroke stripping cycle to longitudinally penetrate the insulation slug during one of the strokes to create two hollow cylindrical insulation halves and to strip the two insulation halves from the conductor during another of the strokes.

2. The apparatus of claim 1 wherein the second cutting means comprises:
   a. a pair of tool holders mounted on opposite sides of a first plane passing through the longitudinal axis of the insulated electrical conductor for opposite reciprocation transverse to the first plane during the first and third strokes of the stripping cycle;
   b. plate means mounted in each tool holder for reciprocation therewith;
   c. first and second jaws mounted in each plate means on opposite sides of a second plane passing through the longitudinal axis of the insulated electrical conductor and perpendicular to the first plane, the first and second jaws defining respective facing knife edges adapted to longitudinally penetrate the insulation from opposite sides of the insulated electrical conductor during the second stroke of the cycle; and
   d. linkage means connecting the first and second jaws to the plate means for oppositely reciprocating the jaws parallel to the first plane during the second and fourth strokes of the stripping cycle.

3. The apparatus of claim 2 wherein each jaw has a front end proximate the insulated electrical conductor and a back end remote therefrom, the jaw front end defining the knife edge.

4. The apparatus of claim 3 further comprising input means for operating each linkage means to oppositely reciprocate the jaws of each pair between an open configuration wherein the knife edges are spaced apart a distance greater than the diameter of the insulation of the insulated electrical conductor and a closed configuration wherein the knife edges are spaced apart a distance less than the diameter of the insulation of the insulated electrical conductor.

5. The apparatus of claim 4 wherein the input means operates the linkage means to reciprocate the knife edges to the open configuration during the first and fourth cycles and to the closed configuration during the second and fourth cycles.

6. The apparatus of claim 4 wherein:
   a. the input means operates the linkage means to reciprocate the knife edges to the open configuration and the tool holder means reciprocates the jaw knife edges toward the first plane during the first stroke of the stripping cycle;
   b. the input means operates the linkage means to reciprocate the jaw knife edges to the closed configuration during the second stroke to approach the second plane and penetrate the insulation slug and create the two hollow cylindrical insulation halves;
   c. the tool holder means reciprocates to withdraw the knife edges away from the first plane with the knife edges remaining in the closed configuration to thereby strip the insulation halves from the conductor during the third stroke; and
   d. the input means operates the linkage means to reciprocate the knife edges to the open configuration during the fourth stroke,
   so that each jaw travels in a respective rectangular path during the stripping cycle.

7. The apparatus of claim 2 further comprising finger means attached to the plate means for gripping the insulated electrical conductor when the jaw knife edges penetrate the insulated electrical conductor.

8. The apparatus of claim 4 further comprising a pair of fingers adjustably mounted to the plate means generally coplanar with the second plane, the fingers being adapted to approach the insulated electrical conductor from opposite sides during the first stroke of the stripping cycle and to grip the insulated electrical conductor therebetween during the second stroke of the stripping cycle.

9. The apparatus of claim 4 further comprising adjustment means connected between the first jaw and the plate means for controlling the spacing between the first and second jaw knife edges when the jaws are in the open and closed configurations.

10. The apparatus of claim 6 wherein:
    a. the plate means comprises a pair of fingers arranged on opposite sides of the insulated electrical conductor;
    b. the tool holder means reciprocates the fingers toward the first plane during the first stroke to grip the insulated electrical conductor during the second stroke; and
    c. the tool holder means reciprocates the fingers away from the first plane during the third stroke,
    so that the fingers grip the insulated electrical conductor while the knife edges penetrate the insulation during the second stroke.

11. Apparatus for center notching an insulated wire comprising:
    a. a machine frame;
    b. at least one pair of cutting blades having respective radiused cutting edges adapted to transversely slice the insulation of the insulated wire;
    c. means mounted in the machine frame for cooperatively reciprocating the cutting blades to sequentially circumferentially slice the insulation and to withdraw from the insulated wire;

d. tool holder means mounted in the machine frame for reciprocation along a first line transverse to the insulated wire; and e. jaw means mounted to the tool holder means for reciprocating along a second line relative to the tool holder means, the second line being perpendicular to the first line, the jaw means including knife means for longitudinally penetrating the insulation of the insulated wire, the tool holder means and jaw means reciprocating sequentially along the first and second lines to translate the knife means in rectangular paths to longitudinally penetrate the insulated electrical conductor and to strip the penetrated insulation from the conductor.

12. The apparatus of claim 11 wherein there are two pairs of cutting blades, the pairs being spaced apart a predetermined distance along the insulated wire to thereby define the length of a slug of insulation that is penetrated and stripped by the knife means.

13. The apparatus of claim 12 wherein the knife means are located to penetrate the slug of insulation between the two pairs of cutting blades.

14. The apparatus of claim 13 wherein the tool holder means comprises:

a. a pair of tool holders located on opposite sides of the insulated wire:

b. drive means mounted to the machine frame for reciprocating the tool holders in opposite directions along the first line and in timed relation to each other; and c. plate means mounted to each tool holder for reciprocation therewith, the jaw means being mounted in the plate means.

15. The apparatus of claim 14 wherein the plate means comprises a pair of spaced plates mounted in each tool holder, the plates having aligned first and second slots therein, the first slots being perpendicular to the first line and the second slots being parallel to the first line.

16. The apparatus of claim 15 wherein the jaw means comprises:

a. first and second jaws retained between the plates mounted in each tool holder, each jaw having a front end proximate the insulated wire and a back end that defines a longitudinally extending slot; and b. linkage means connecting the jaws to the plates for producing equal parallel and opposite motion of the jaws relative to the plates along the second line.

17. The apparatus of claim 16 wherein the knife means comprises a knife edge situated on the front end of each jaw, the knife edges of the first and second jaws being in facing operative relationship.

18. The apparatus of claim 16 wherein the linkage means comprises:

a. at least one first link having a first end pivotally connected to the first jaw and retained in the first slots of the plates and a second end pivotally retained in the slot in the back end of the second jaw;

b. at least one second link having a first end pivotally connected to the second jaw and retained in the first slots of the plates and a second end pivotally retained in the slot in the back end of the first jaw; and c. pivot means retained in the second slots in the plates for pivotally connecting the midpoints of the first and second links, so that the jaws are constrained to move parallelly and in opposite directions to each other and in equal amounts.

19. The apparatus of claim 16 further comprising input means for operating the linkage means to produce parallel and opposite motions of the jaws.

20. The apparatus of claim 11 further comprising finger means mounted to the tool holder means for reciprocating therewith to snugly grip the insulated wire when the knife means longitudinally penetrates the insulation.

21. The apparatus of claim 15 further comprising a finger adjustably fastened to at least one of the plates mounted in each tool holder, the fingers being positioned to snugly grip the insulated wire between them as the knife means penetrates the insulation.

22. The apparatus of claim 11 further comprising adjustment means mounted between the tool holder means and the jaw means for controlling the penetration of the knife means into the insulation.

23. The apparatus of claim 17 further comprising means for adjusting the position of the first jaw along the second line relative to the plates, so that the linkage means produces equal and opposite positioning of the second jaw to thereby set the spacing between the facing knife edges to control the penetration of the knife edges into the insulated wire.

24. Apparatus for stripping insulation of a predetermined length from an insulated electrical conductor comprising:

a. first and second plates located on opposite sides of a first plane passing longitudinally through the axis of the insulated electrical conductor;

b. drive means for oppositely reciprocating the plates along a first line perpendicular to the first plane;

c. first and second pairs of jaws mounted in the respective plates with a jaw being located in each of the quadrants around the axis of the insulated electrical conductor, each jaw having a front end defining a knife edge that is proximate to the insulated electrical conductor, the knife edges of the jaws of each pair being in facing operative relationship and being adapted to longitudinally penetrate the length of insulated electrical conductor; and d. linkage means for retaining the pairs of jaws in the respective plates and for reciprocating the jaws within the respective plates along a second line parallel to the first plane between an open configuration wherein the jaw knife edges of each pair are spaced apart farther than the diameter of the insulated electrical conductor and a closed configuration wherein the knife edges of each pair are spaced apart a distance less than the diameter of the insulation of the insulated electrical conductor.

25. The apparatus of claim 24 wherein the drive means reciprocates the plates and the linkage means reciprocates the jaws in timed relation to each other in a four-stroke cycle, and wherein the knife edges penetrate the insulation during one of the strokes and the knife edges strip the insulation transversely from the insulated electrical conductor during another of the strokes of the cycle.

26. The apparatus of claim 25 wherein the drive means and the linkage means reciprocate the plates and the jaws, respectively, in alternating translations to cause each of the jaws and the respective knife edges thereon to travel in a rectangular path during a stripping cycle.

27. The apparatus of claim 24 wherein:
   a. the drive means reciprocates the plates and jaws thereon toward the first plane until the knife edges are coincident therewith during the first stroke, with the jaw knife edges being in the open configuration;
   b. the linkage means reciprocates the jaws to advance the respective knife edges parallelly along the first plane toward the axis of the insulated electrical conductor to thereby cause the knife edges to penetrate the insulation and create hollow cylindrical insulation halves during the second stroke;
   c. the drive means reciprocates the plates and jaws thereon away from the first plane to thereby strip the insulation halves from the insulated electrical conductor during the third stroke; and
   d. the linkage means reciprocates the first and second jaws in each plate parallelly to the first plane and away from each other to thereby return the first and second jaw knife edges to the open configuration during the fourth stroke,
   so that the knife edges travel in a four stroke cycle and the knife edges travel in respective rectangular paths.

28. The apparatus of claim 25 further comprising finger means attached to each plate for reciprocating therewith to snugly grip the insulated electrical conductor when the knife means penetrates the insulation thereof.

29. The apparatus of claim 24 further comprising adjustment means connected between each first jaw and the associated plate for controlling the spacing between the knife edges of the respective first and second pairs of jaws in the open and closed configurations.

30. A method of center notching an insulated electrical conductor comprising the steps of:
   a. providing two pairs of generally flat cutting blades having respective radiused cutting edges adapted to transversely cut the insulation;
   b. placing the pairs of cutting blades in respective first planes perpendicular to the axis of the insulated electrical conductor at predetermined locations along the insulated electrical conductor;
   c. oppositely translating the pairs of cutting blades in their respective planes to respective closed positions wherein the cutting blades radiused cutting edges cooperate to slice the insulation and to define a slug of insulation;
   d. oppositely reciprocating the pairs of cutting blades longitudinally along the insulated electrical conductor from their respective first planes to tear any insulation connecting the slug insulation with the parent insulation adjacent the slug, the blades of each pair remaining flat and coplanar while being oppositely reciprocated;
   e. withdrawing the cutting blades from the insulated electrical conductor;
   f. longitudinally penetrating the slug of insulation from diametrically opposed sides to form two hollow cylindrical halves of insulation; and
   g. stripping the two insulation halves transversely from the conductor.

31. A method of center notching an insulated electrical conductor comprising the steps of:
   a. circumferentially slicing the insulation at predetermined spaced location along the insulated electrical conductor to define a slug of insulation;
   b. providing first and second pairs of jaws with each pair of jaws being on opposite sides of a first plane passing longitudinally through the axis of the insulated electrical conductor, each pair of jaws having respective operatively facing knife edges;
   c. translating the first and second pairs of jaws toward a first plane passing longitudinally through the axis of the insulated electrical conductor until the knife edges are substantially coincident with the first plane;
   d. translating the jaws of the first and second pairs thereof toward a second plane passing longitudinally through the axis of the insulated electrical conductor and perpendicular to the first plane until the knife edges have penetrated the slug of insulation to within close proximity of the conductor; and
   e. stripping the two insulation halves transversely from the conductor.

32. The method of claim 31 wherein the step of stripping the insulation comprises the steps of:
   a. translating the first and second pairs of jaws in opposite directions away from the first plane to thereby remove the hollow cylindrical insulation halves from the conductor; and
   b. translating the jaws of the first and second pairs thereof away from the second plane to thereby enable the insulation halves to be removed from between the knife edges.

33. The method of claim 31 further comprising the steps of:
   a. providing a pair of fingers that are generally coplanar with the second plane and located on opposite sides of the insulated electrical conductor;
   b. translating the fingers toward the first plane in synchronization with the translation of the first and second pairs of jaws toward the first plane; and
   c. gripping the insulated electrical conductor with the fingers while the knife edges penetrate the insulation.

34. A method of center notching an insulated electrical conductor comprising the steps of:
   a. circumferentially slicing the insulation at predetermined spaced locations along the insulated electrical conductor to define a slug of insulation;
   b. longitudinally penetrating the slug of insulation from diametrically opposed sides to form two hollow cylindrical halves of insulation;
   c. stripping the two insulation halves transversely from the conductor; and
   d. gripping the insulated electrical conductor on opposite sides thereof while the knife edges penetrate the insulation.

35. A method of center notching an insulated wire comprising the steps of:
   a. circumferentially slicing the insulated wire at predetermined locations therealong to define a slug of insulation;
   b. providing four knife edges adapted to longitudinally penetrate the insulation of the slug of insulation;
   c. locating the four knife edges in respective quadrants around the axis of the insulated wire;
   d. translating the knife edges toward a first plane passing through the longitudinal axis of the insulated wire until the knife edges are generally coincident therewith;
e. translating the knife edges toward a second plane passing though the axis of the insulated wire and perpendicular to the first plane to penetrate the insulation of the slug until the knife edges are in close proximity to the wire conductor;
f. translating the knife edges away from the first plane; and
g. translating the knife edges away from the second plane, so that each of the knife edges undergoes a four stroke cycle to strip the slug of insulation from the insulated wire.

36. The method of claim 35 wherein the step of circumferentially slicing the insulation at predetermined locations along the insulated wire comprises the step of longitudinally tearing insulation between the insulation at the ends of the slug and the parent insulation on the insulated wire adjacent the slug.

37. The method of claim 35 wherein the steps of translating the knife edges toward and away from the first and second planes comprises the steps of translating the knife edges toward and away from the first plane in equal distances and translating the knife edges toward and away from the second plane in equal distances, so that each jaw travels in a rectangular path during a stripping cycle.

38. The method of claim 35 wherein the step of translating the knife edges toward the first plane comprises the step of gripping the insulated wire from opposite sides thereof.

39. The method of claim 35 comprising the further steps of:
a. providing a pair of fingers generally coincident with the second plane and on opposite sides of the insulated wire; and
b. translating the fingers toward the first plane in unison with the knife edges to grip the insulated wire when the knife edges coincide with the first plane.

* * * * *